UNITED STATES PATENT OFFICE.

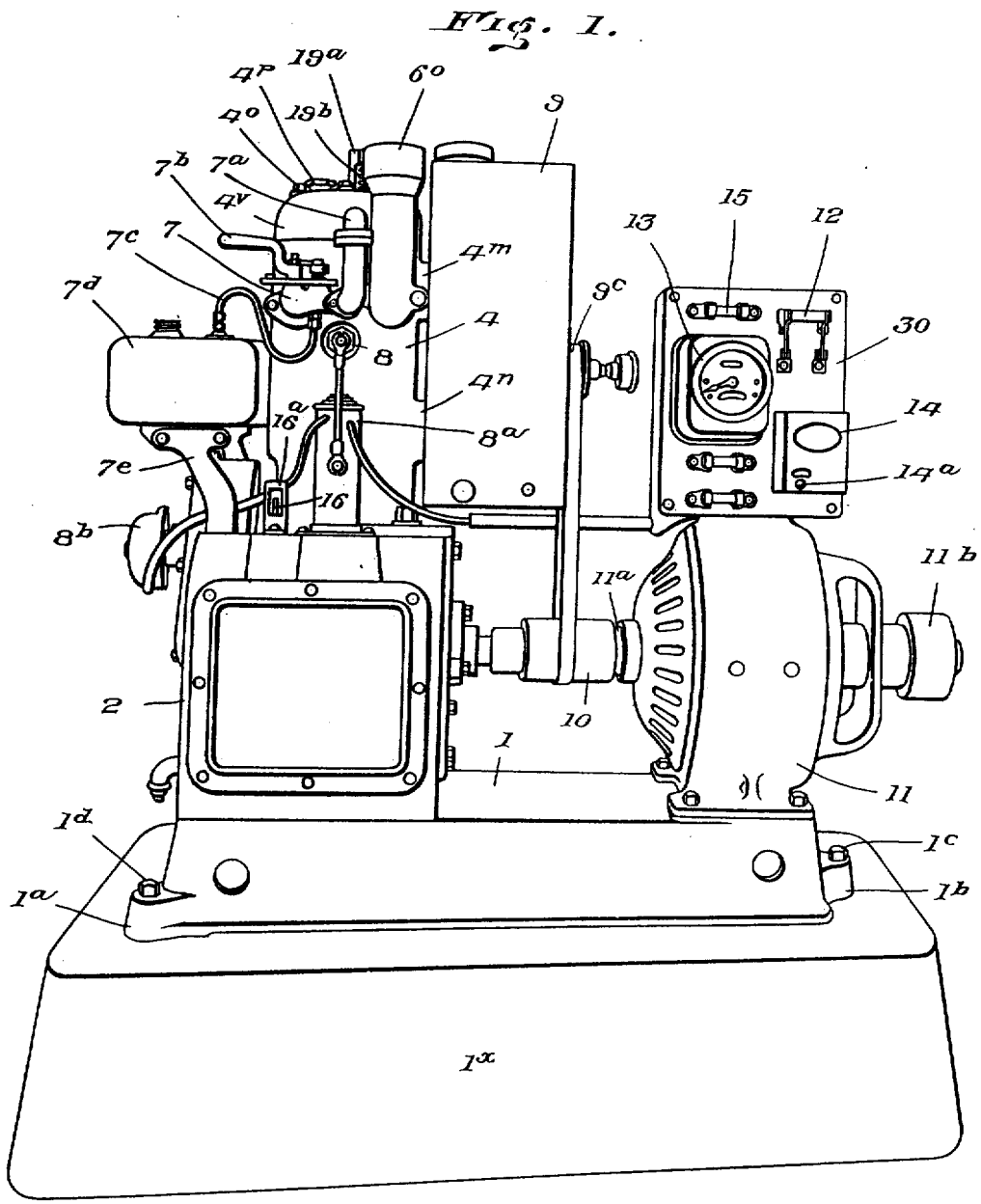

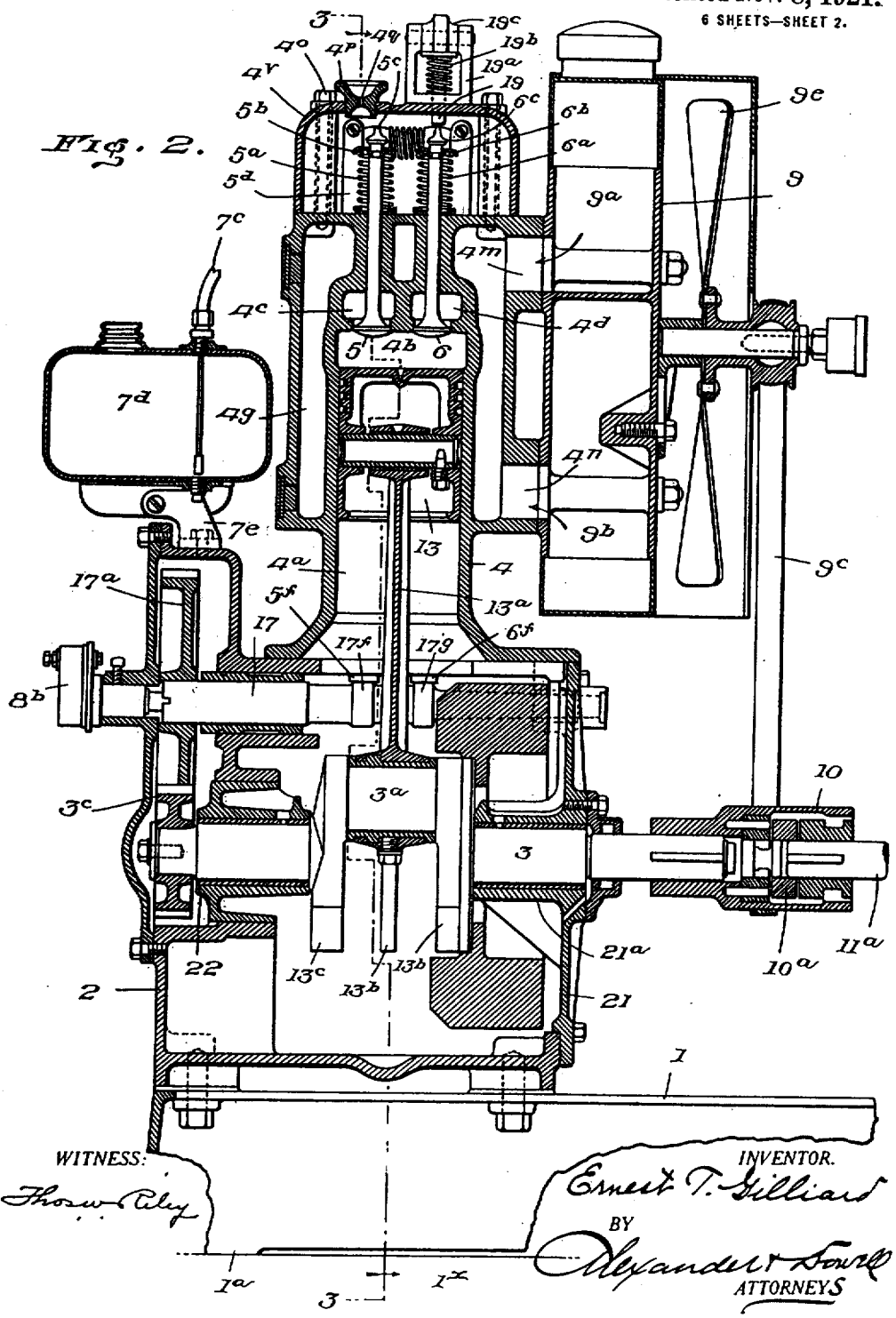

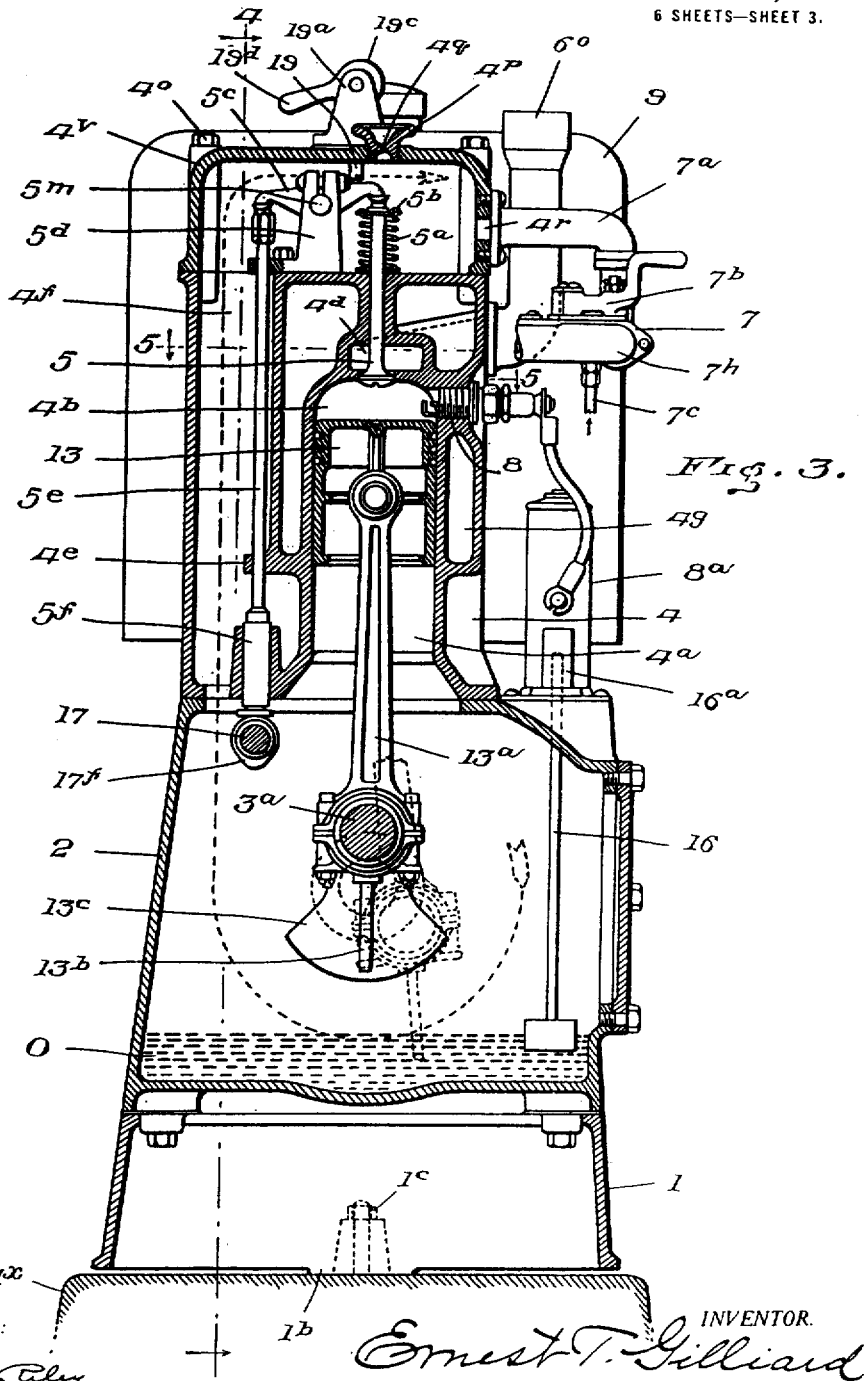

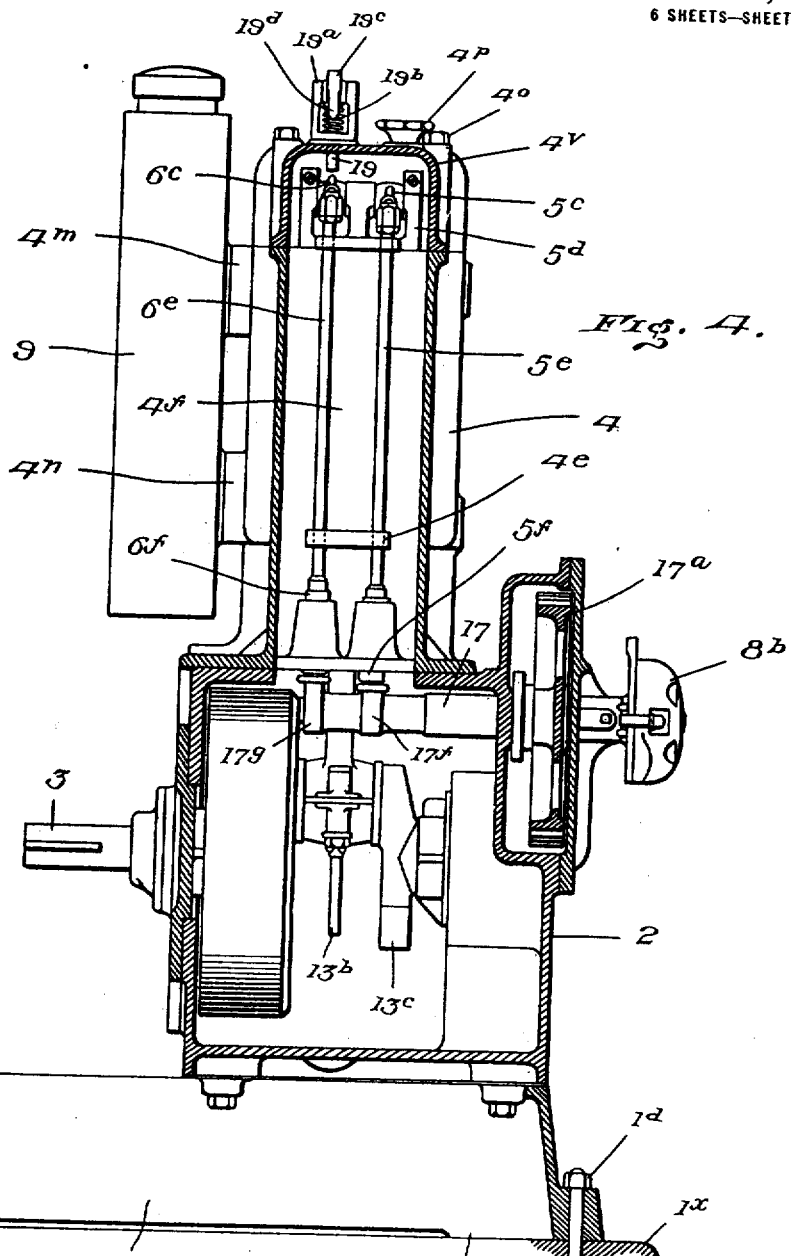

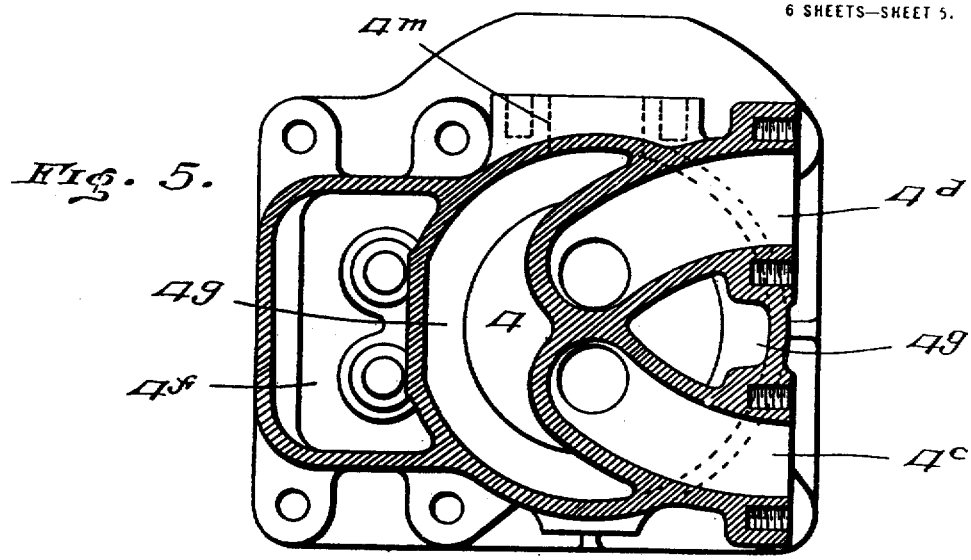
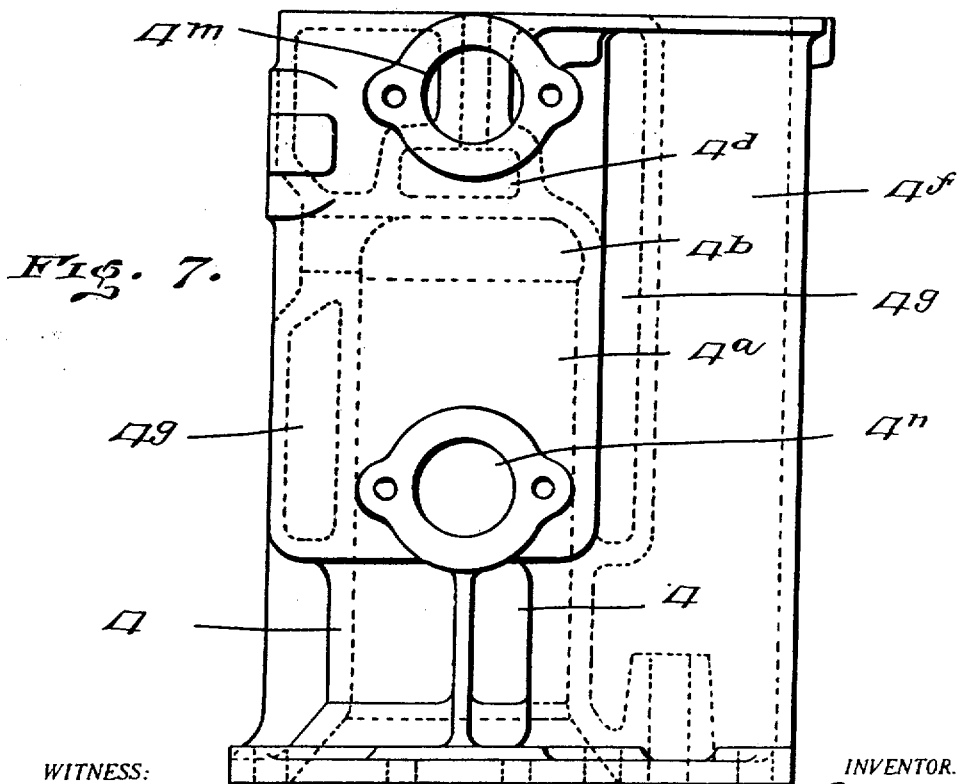

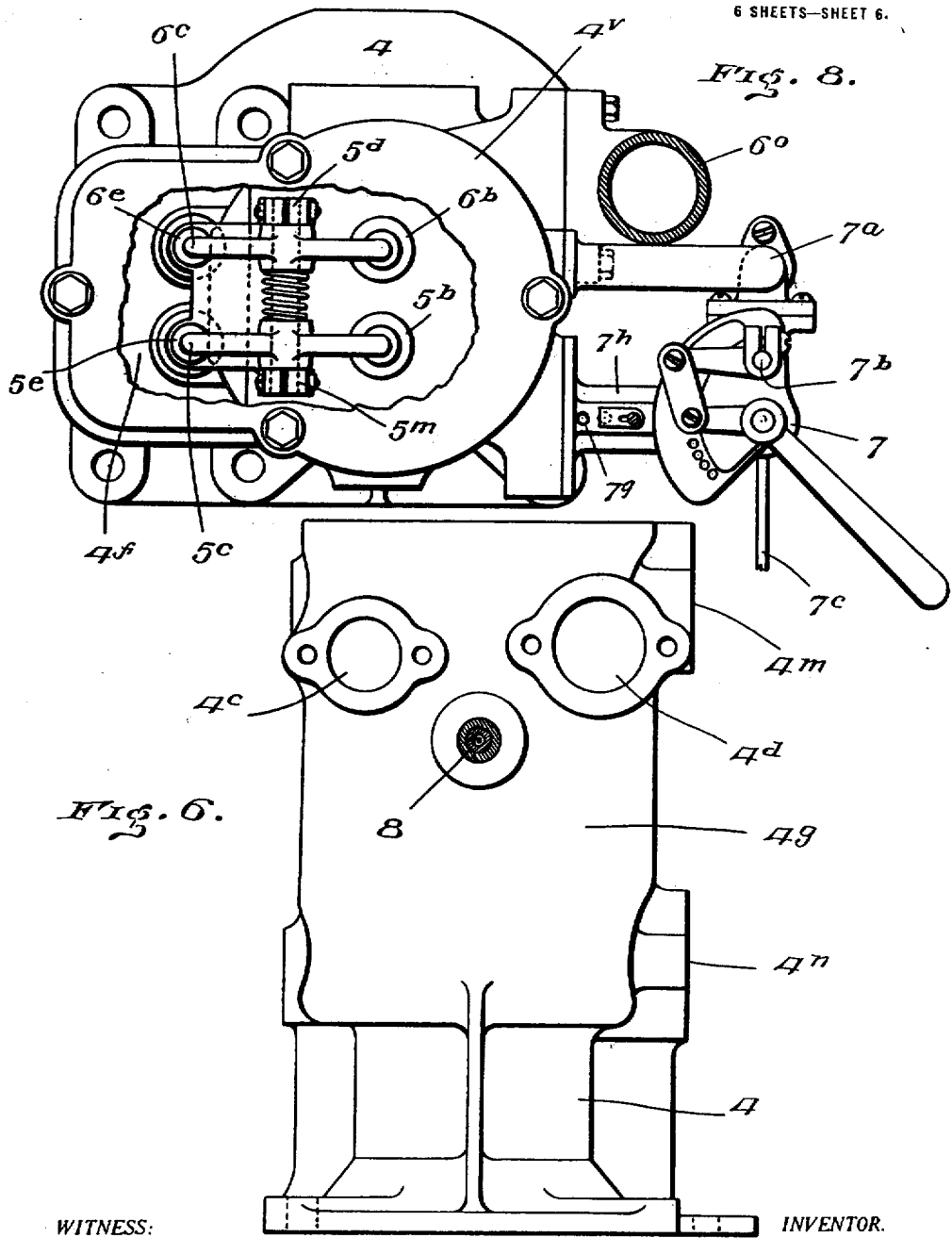

ERNEST T. GILLIARD, OF HANOVER, PENNSYLVANIA.

INTERNAL-COMBUSTION ENGINE.

1,396,418.　　　Specification of Letters Patent.　Patented Nov. 8, 1921.

Application filed January 24, 1919. Serial No. 272,871.

*To all whom it may concern:*

Be it known that I, ERNEST T. GILLIARD, a citizen of the Republic of Switzerland, residing at Hanover, in the county of York and State of Pennsylvania, have invented certain new and useful Improvements in Internal-Combustion Engines; and I hereby declare that the following is a full, clear, and exact description thereof, reference being had to the accompanying drawings, which form part of this specification.

This invention relates to small, compact, light and power developing apparatus, designed for use on farms and in residences, and small factories, where the usual city electric power supplies are not available, and which unitary apparatus is capable of developing sufficient current to carry a small number of electric lights sufficient for lighting an ordinary house and its out buildings, and which apparatus can be also used for power purposes to drive small tools and household machines.

The present invention has particular reference to the internal combustion engine part of such apparatus, and its major object is to provide an engine which is simple in construction, can be operated at very low cost and by unskilled people, and in which all the moving parts will be properly lubricated.

I will describe the invention as used in an apparatus of the character specified, and in particular explain the construction of the engine and its valve mechanism, and summarize in the claims the essential novel features and combinations of parts which I desire to protect by the present application for patent.

In said drawings:

Figure 1 is a view of a complete apparatus embodying my engine as part thereof.

Fig. 2 is a longitudinal section through the engine portion of the apparatus.

Fig. 3 is a transverse section taken approximately on the dotted line 3—3, Fig. 2.

Fig. 4 is a section taken approximately on the dotted line 4—4, Fig. 3.

Fig. 5 is an enlarged transverse section of the engine cylinder casting taken on the dotted line 5—5, Fig. 3.

Fig. 6 is a front view of such casting detached.

Fig. 7 is a side view thereof.

Fig. 8 is an enlarged top plan view of Fig. 3 with the cap partly broken away.

The complete apparatus as indicated in Fig. 1 comprises in brief a base 1 upon one end of which is mounted a vertically disposed internal combustion engine having a crank case 2, and a cylinder casting 4 supported on such crank case, the piston in the cylinder being operatively connected with the crank shaft 3 journaled in said case. The engine is provided with a carbureter 7; a radiator 9; a fuel tank $7^d$; an ignition timer $8^b$; and a sparking coil $8^a$; and suitable connections between these parts.

The crank shaft is connected by a coupling 10 to the shaft of an electric motor-generator 11 which is driven by the engine as a generator when it is desired to generate electric current, and is adapted to be used as a motor to start the engine, or when it is desired to use it as an electric motor to run light machinery.

The complete apparatus includes a storage battery (not shown) of any suitable kind. The apparatus is provided as indicated with an ampere meter 13 to show the condition of charge of battery; and said meter is also preferably provided with means for automatically shutting off ignition when the battery is fully charged, thus stopping the engine. The apparatus is also provided with an automatic cut-out 14 and a starting switch or button $14^a$; and suitable electrical connections are provided between the motor-generator and a storage battery, of usual construction, not shown. The generator shaft may be provided with a pulley so that the apparatus can be used to run light machinery if desired.

I do not herein claim the particular construction of the radiator; carbureter; or crank case; indicated in the drawings, as these form the subject matter of companion applications hereinafter mentioned; and I do not herein claim any of the electrical apparatus *per se*.

The present invention has particular reference to the internal combustion engine portion of the apparatus, which engine is used for driving the motor-generator to generate electricity or develop power; and I will now explain the engine portion of the apparatus in detail.

The base 1 is preferably made of cast metal and with three bearing points; two being at the opposite corners of one end of the base, as indicated at $1^a$, while the third $1^b$ is at the center of the opposite end of the base. These three points are so positioned as to give a three-point bearing to the base on the foundation or support upon which such base is mounted. Preferably the base is mounted upon a concrete foundation $1^x$ and secured thereto by bolts and nuts, indicated at $1^c$ and $1^d$. This three-point bearing prevents distortion of the alinement of bearings and facilitates setting up the apparatus truly upon its foundation or support.

Bolted upon the base 1 adjacent the bearings $1^d$ is a crank case 2, which is provided with bearings $21^a$ and 22 for a crank shaft 3, shown as having a single crank $3^a$ connected by a pitman $13^a$ with a piston 13 moving within a cylinder $4^a$, formed within a casting 4 that is mounted upon and rigidly bolted to the top of the crank case 2.

The cylinder $4^a$ is closed at top and open at bottom; and the engine is preferably a four cycle engine, and the power stroke is a down stroke. The lower end of the cylinder opens into the interior of the crank case through an opening in the top thereof, and said case should be so constructed as to be substantially air and oil tight; and upon the down stroke of the piston the air beneath the piston and within the crank case is compressed, and on the up stroke of the piston the air within the crank case will be rarefied.

I do not herein claim the particular construction of the crank case and means of mounting the crank shaft and connected parts therein, indicated in the drawings, as these form the subject matter of a companion application, Serial Number 272,872.

The upper end of the cylinder $4^a$ is closed and the space in the cylinder above the piston forms an explosion chamber $4^b$ with the top of which communicates an inlet port $4^c$ and an outlet port $4^d$, which ports are formed by suitable ducts in the casting 4 and both open at the front side thereof, see Figs. 5 and 6.

These ports are respectively closed by valves 5 and 6 the stems of which extend through bores in the upper end of the casting 4 and project above the top thereof as indicated in Fig. 2.

A spring $5^a$, interposed between a collar $5^b$ on the upper end of the stem of valve 5 and the top of the casting 4, normally holds the valve 5 closed. Similarly a spring $6^a$, interposed between a collar $6^b$ on the upper end of the stem of valve 6 and the top of the casting 4, normally holds the valve 6 closed.

The valve 5 is adapted to be opened by means of a rocking lever $5^c$ which is pivoted on a pin $5^m$ mounted in a bracket $5^d$ attached to the top of the casting 4; one end of lever $5^c$ engages the stem of valve 5 and its other end is adapted to be engaged by a push rod $5^e$, which is guided in openings in the bracket $5^d$ and in a lug $4^e$ formed on the inner wall of the casting 4 exterior to the water jacket thereof and within a vertical passage $4^f$ formed in the casting 4 exterior to the cylinder $4^a$ and in rear thereof. The rod $5^e$ is lifted at the proper times by means of a plunger $5^f$ to cause lever $5^c$ to open the valve 5. Plunger $5^f$ is guided in a bore in the base of the casting 4, at the lower end of the chamber $4^f$, and is engaged by a cam $17^f$ on a cam shaft 17 mounted in the crank case.

Similarly the valve 6 may be opened at the desired times by means of a rock lever $6^c$ pivoted on the casting $5^d$ and having its rear end engaged by a push rod $6^e$, the lower end of which engages a plunger $6^f$ which is actuated by a cam $17^g$ on the cam shaft 17. The exhaust gases escape through port $4^d$ to an outlet tube $6^o$ attached to the casting 4, and which may be connected to a pipe to conduct the exhaust gases to any desired point of discharge.

The cam shaft 17 is journaled in the crank case at one side of the cam shaft 3 and below the plungers $5^f$, $6^f$, and said cam shaft may be driven from the crank shaft 3, by means of a gear $17^a$ on shaft 17 meshing with a pinion $3^b$ on the shaft 3; said gears are within the crank case and are so proportioned as to cause the cam shaft 17 to rotate in proper timed relation with the shaft 3; and the cams $17^f$, $17^g$ are so disposed as to open and release the valves 5 and 6 alternately at the proper times. Preferably the said valves open inwardly and are positively opened by the cams and push rods; and are automatically closed by the springs and the pressure of the gases when the cams permit.

The upper part of the cylinder $4^a$ is surrounded by a water jacket $4^g$ which also extends around the stems of the valves 5 and 6; this jacket is formed by coring the casting 4. The chamber $4^f$ is in rear and exterior to this water jacket, see Fig. 3, so that the valve operating parts are protected by the water jacket from the heat in the explosion chamber $4^b$.

The passage $4^f$ communicates at bottom with the interior of the crank case 2 so that the air pulsating in the crank case under the action of the piston 13 also pulsates through this passsage $4^f$ into the interior of a cap or head $4^v$ fitted onto the upper end of the casting 4, and rigidly secured thereto by stud bolts 40, or other suitable means. This cap incloses the upper ends of the valve stems, rocking levers $5^c$, $6^c$, and the upper ends of the rods $5^e$, $6^e$. The interior of this cap communicates directly with the interior of the upper end of the passage $4^f$; and the interiors of the crank case, the passage $4^f$, and the cap, virtually form one continuous air chamber. The admission of air to or from this air chamber is controlled by a plug 4ᵖ screwed into an opening in the top of the cap 4ᵛ and provided with a small air inlet aperture 4ᵠ through which air is admitted into the interior of the cap and thence to the carbureter as hereinafter explained.

The cap 4ᵛ is provided with an aperture 4ʳ preferably at the end farthest removed from the passage 4ᵗ and this communicates by means of a pipe 7ᵃ with the carbureter 7, which is provided with suitable regulating valve 7ᵇ, fuel inlet 7ᶜ, and an outlet member 7ʰ, which conducts the fuel to the inlet port 4ᶜ. The carbureter is preferably provided with an auxiliary air inlet 7ᵉ and the construction is such that on the proper down stroke of the piston 13 air is drawn from within cap 4ᵛ to and through the carbureter and into the explosion chamber as hereinafter explained; and it will be seen that this creates a suction or rarefication of the air within the air chamber in the cap, casting, and crank case.

The fuel used may be kerosene or gasolene and can be conveniently supplied from a tank 7ᵈ supported in suitable brackets 7ᵉ on the crank case and provided with the usual filling devices and indicator. The fuel is drawn from this tank by suction caused by the descent of the piston in the cylinder on its intake stroke; and the amount of fuel admitted into the carbureter is regulable by the valve 7ᵇ.

The carbureter takes its air from the interior of said cap through pipe 7ᵃ. Fresh air is introduced into the cap through the opening 4ᵠ in the plug. The size of the hole 4ᵠ in plug 4ᵖ is of such caliber that the up stroke of the piston 13 will cause a partial vacuum or suction in the crank case and air chamber; which, as stated above, is composed of the combined spaces of the interior of the crank case, the channel 4ᵗ, and the cylinder head or cap 4ᵛ.

The production of a certain degree of vacuum or suction in the crank cases of single acting internal combustion engines is desirable as this will prevent oil escaping or leaking out of the crank case at the crank shaft bearings.

The vacuum or suction in the cylinder caused by the piston on its intake stroke is utilized to draw the fuel into the carbureter, and this suction also draws a small quantity of outside air into the cap through the perforated plug to supply the demands of the carbureter.

I do not herein claim the particular construction of the carbureter as that will form the subject matter of a companion application, Serial Number 272,873.

The engine may be provided with any suitable devices for igniting the fuel at the proper time. As shown I provide a spark plug 8 which is connected in the usual manner to a battery 8ᵃ and controlled by an ignition timer 8ᵇ of any suitable construction, which as shown may be conveniently mounted in brackets on the crank case opposite the end of the cam shaft 17 and operatively connected with said shaft so as to be rotated thereby. I do not herein claim the ignition timer, battery, and spark plug *per se*, as such devices are well known and may be of any suitable kind.

The crank case is also used as an oil reservoir and is supplied with oil, indicated at 0, which can be introduced thereinto by removing the plug 4ᵖ and pouring oil into the cap 4ᵛ, the oil passing down through the passage 4ᵗ into the crank case. The amount of oil in the crank case 2 can be readily determined by a visual indicator, which consists of a rod 16 depending into the crank case and connected with a small float therein; the outer end of the rod being protected by a housing 16ᵃ attached to the top of the crank case, as shown.

The pitman 13ᵃ is provided on its lower end with a finger 13ᵇ and counter balances 13ᶜ, and these tend to splash the oil in the crank case and cause it to thoroughly lubricate the bearings of the shafts and all moving parts therein.

In order to facilitate starting the engine I provide suitable devices for holding open the valve 6 to release compression. The device shown comprises a pin 19 located directly above the lever 6ᵉ and extending through an opening in the cap 4ᵛ and in a bracket 19ᵃ attached to the cap. The pin 19 is normally upheld by a spring 19ᵇ interposed between its head and the base of the bracket, the head of the pin bearing against a cam 19ᶜ, pivoted in the bracket 19ᵃ above the pin 19, and provided with a handle 19ᵈ by which it can be readily turned. When the handle is moved in one position the pin 19 is raised and held out of position to engage the arm 6ᶜ by the spring 19ᵇ, and does not interfere with the operation of the valve 6. When it is desired to release or prevent compression in the cylinder the cam 19ᶜ is turned so as to depress the pin causing it to engage the lever 6ᵉ and depress the stem of valve 6, holding such valve open and preventing compression of gases in the cylinder on the up stroke of the piston.

The fluid in the water jacket 4ᵍ circulates through the jacket and passes out through an opening 4ᵐ in the upper part of the casting 4 into the inlet chamber 9ᵃ of a radiator 9, which may be of any suitable construction, but is preferably constructed as indicated in the drawings. After passing through the cooling tubes of the radiator the fluid reënters the return chamber 9ᵇ thereof and passes back into the lower part of the water jacket through a passage 4ⁿ in the casting, as indicated in Fig. 2. This radiator is not claimed *per se* herein being described and shown in my companion application, Serial Number 272,874. The radiator may be provided with a fan 9ᵉ that can be driven by a belt 9ᶜ from a member 10 that connects the shaft 3 with the shaft 11ᵃ of the motor generator 11.

The motor generator 11 may be of any suitable construction, but is preferably provided with compound windings for use as a motor in starting the engine; and with shunt windings for use as a generator when driven by the engine to generate current for charging storage batteries or generating direct current for lighting or power purposes. I do not herein claim any particular construction of motor-generator.

The shaft 11ᵃ of the motor may be connected with the shaft 3 by a self-adjusting or compensating joint indicated at 10ᵃ of any suitable construction, so that there will be no strains on the bearings of either crank shaft or motor-generator shaft if they are not in exact axial alinement. The armature shaft 11ᵃ may also be provided with a small pulley 11ᵇ on its outer end which can be belted to light machinery to operate same.

Supported upon and above the motor is shown a plate 30 carrying an ignition fuse 15; also a bi-pole switch 12 controlling the electrical connection between the motor-generator and the storage battery. (Not shown.) Also an ampere hour meter 13 which indicates the condition of the storage battery and is preferably constructed so that it will automatically cut out the ignition circuit when the battery is fully charged. Also a controller 14 which is arranged to automatically connect the generator to the storage battery when the engine reaches normal speed of operation, and to automatically disconnect them when the engine stops. This controller is provided with a push button 14ᵃ which when pushed in closes a circuit from the battery to the motor-generator compound windings so that the motor generator acts as a motor and starts the engine in operation. Suitable electrical connections are made between the several electrical portions of the apparatus, but as these portions and connections are not features of the present invention they are not shown nor described in detail.

I do not herein claim any of the foregoing electrical parts *per se*, but merely refer thereto and have indicated same in the drawing, as these, together with the novel engine, when arranged as indicated in the drawings, make up a complete small unitary compact easily transported internal combustion engine operated electric generating apparatus, which has many practical advantages and is capable of varied uses, being especially designed for producing light for individual houses on farms and elsewhere, where the usual commercial power stations and electric current are not available.

It will be seen that the up and down motion of piston 13 in the cylinder creates a variation of pressure in the crank case 2, which will carry some of the lubricant, splashed in the case by the crank and pin 13ᵇ thereon, through the passage 4ᵗ into the upper part of the engine case or cap 4ᵛ.

What I claim is:

1. In an internal combustion engine having a closed crank case, a cylinder communicating with said case having inlet and outlet ports opposite the case, an air chamber to inclose the valve operating levers, and an air passage directly communicating with and connecting the interior of the crank case and said air chamber.

2. A cylinder-casting for explosive engines, having a bore forming a cylinder open at one end, inlet and outlet ports communicating with the closed end of the cylinder, and a longitudinal air passage extending entirely through the casting exterior to and beside the cylinder and adapted to form part of the air space of the crank case and to house the valve actuating rods.

3. A cylinder casting for explosive engines, having a bore forming the cylinder open at one end, inlet and outlet ports communicating with the closed end of the cylinder, a water jacket surrounding the explosion chamber end of the cylinder and having inlet and outlet ports, and a longitudinal air passage extending through the casting and beside the water jacket and cylinder and adapted to form part of the air space of the crank case and to house the valve-actuating rods.

4. A cylinder casting for explosive engines, having a bore forming the cylinder open at one end, inlet and outlet ports communicating with the closed end of the cylinder and opening through one side of the casting, a water jacket surrounding the explosion chamber end of the cylinder and having inlet and outlet ports opening through another side of the casting; and a longitudinal air passage extending through the casting and beside the water jacket and cylinder and adapted to form part of the air space of the crank case and to house the valve-actuating rods.

5. A cylinder casting for explosive engines, having a bore forming the cylinder open at one end, inlet and outlet ports communicating with the closed end of the cylinder and opening through one side of the casting, bores for the stems of the valves of such ports, a water jacket surrounding the explosion chamber end of the cylinder and the valve stem bores and ports and having inlet and outlet ports in another side of the casting, and a longitudinal air passage opening entirely through the casting and beside 6. In an internal combustion engine having a closed crank case; a cylinder communicating with said case having inlet and outlet ports opposite the case, an air chamber inclosing the valve operating levers and an air passage directly communicating with and connecting the interior of the crank case and said air chamber; with a crank shaft in the case; a piston in the cylinder connected with said crank shaft; valves for said ports, valve operating levers mounted on said cylinder, valve actuating devices extending from said chamber through said passage into the crank case, and means in the crank case for actuating said cam rods.

7. In an internal combustion engine having a substantially air tight crank case; a crank shaft mounted therein; a casting connected with said case having a cylinder opening at one end into said case, inlet and outlet ports in its other end, and an air passage at one side of the cylinder communicating at one end with said crank case; and a hollow cap covering the outer end of the casting, the interior of the cap communicating with the outer end of said passage and the interiors of the crank case, cap and passage forming a continuous air space, whereby the valve operating mechanism is lubricated by the splash of oil in the case.

8. In an internal combustion engine, having a substantially air tight crank case, and a crank shaft mounted therein; a casting connected with said case having a cylinder opening at one end into said case, inlet and outlet ports in its other end, and an air passage at one side of the cylinder communicating at one end with said crank case; and a hollow cap covering the outer end of the casting, the interior of the cap communicating with the outer end of said passage; with a piston in the cylinder, a piston rod connecting the piston with the crank shaft; valves closing said ports, valve operating devices in said cap, valve actuating rods engaging said operating devices and extending through said passage to the crank case; and cams on said cam shaft for operating said rods.

9. In an engine, the combination of a substantially air tight crank case, a crank shaft and cam shaft mounted therein; gearing in said case between said shafts, a casting connected with said case having a cylinder opening at one end into said case, and provided with inlet and outlet ports at its outer end, and an air passage at one side of the cylinder communicating at one end with said crank case; a hollow cap covering the outer end of the casting, the interior of the cap communicating with the outer end of said passage; the interiors of the crank case, cap and passage forming a continuous air space; with a piston in the cylinder, a piston rod connecting the piston with the crank-shaft, valves closing said ports, valve operating levers pivotally mounted in said cap, valve actuating rods engaging said levers and extending through said passage to the crank case; and cams on said cam shaft for operating said rods.

10. In an internal combustion engine, a substantially air tight crank case; a casting connected with said case having a cylinder opening at one end into said case, and an air passage at one side of the cylinder, and a hollow cap covering the outer end of the casting the interiors of the crank case and cap and passage forming a continuous air space and permitting lubrication of the valve operating mechanisms by the splash of oil in the case; and a piston in the cylinder; with a carbureter exterior to the cylinder, means for conducting air from the interior of said cap to the carbureter upon the intake stroke of the piston, means for directing the mixture from said carbureter to the inlet port of the engine, and means controlling the entry of air into said cap.

11. In an internal combustion engine having a closed crank case, a cylinder communicating with said case having inlet and outlet ports and valve operating levers mounted on the cylinder, a hollow cap attached to said cylinder and inclosing said valve operating levers, an air passage at one side of the cylinder, the interiors of the cap passage and crank case forming a continuous air chamber; a crank shaft in the case, a piston in the cylinder connected with said crank shaft, valve actuating devices extending from said cap through said passage into the crank case, and means for operating said valve actuating devices; with a carbureter exterior to the cylinder, means for conducting air from the interior of said cap to the carbureter upon the intake stroke of the piston, means for directing the mixture from said carbureter to the inlet port of the engine, and a perforated plug in the cap for permitting a small quantity of air to enter it, substantially as described.

12. In an internal combustion engine having a closed crank case; a cylinder communicating with said case having inlet and outlet ports opposite the case, an air chamber inclosing the valve operating levers, and an air passage directly communicating with and connecting the interior of the crank case and said air chamber; a crank shaft in the case, a piston in the cylinder connected with said crank shaft; valves for said ports, valve operating levers mounted on said cylinder, valve actuating devices extending from said chamber through said passage into the crank case, and means in the crank case for actuating said cam rods; with a carbureter exterior to the cylinder, means for conducting air from the interior of said chamber to the carbureter, means for directing the mixture from said carbureter to the inlet port of the engine upon the intake stroke of the piston, and means for permitting a small quantity of air to enter said air chamber.

13. In an internal combustion engine, having a substantially air tight crank case, and a casting connected with said case having a cylinder opening at one end into said case, inlet and outlet ports in its other end, and an air passage at one side of the cylinder communicating at one end with said crank case; and a hollow cap covering the outer end of the casting, the interior of the cap communicating with the outer end of said passage; with a piston in the cylinder, a piston rod connecting the piston with the crank shaft; valves closing said ports, valve operating devices in said cap; valve actuating rods engaging said operating devices and extending through said passage to the crank case; cams on said cam shaft for operating said rods; a carbureter exterior to the cylinder, means for conducting air from the interior of said chamber to the carbureter, means for directing the mixture from said carbureter to the inlet port of the engine upon the intake stroke of the piston, and means for permitting a small quantity of air to enter said air chamber.

14. In an internal combustion engine, a closed crank case; a casting having a cylinder communicating with said case having inlet and outlet ports in its upper end opposite the case, said cylinder having an air passage at one side directly communicating with and connecting the interiors of the crank case and cap; a crank shaft in the case, a piston in the cylinder connected with said crank case; valves for said ports, valve operating levers mounted on said end of the cylinder; a hollow cap attached to said cylinder end and inclosing the valve operating levers; valve actuating devices extending from said cap through said passage into the crank case, and means in the crank case for operating said valve actuating devices; with a carbureter exterior to the cylinder, means for conducting air from the interior of said cap to the carbureter, means for directing the mixture from said carbureter to the inlet port of the engine upon the intake stroke of the piston, and a perforated plug in said cap for permitting a small quantity of fresh air to enter therein.

15. In an engine, the combination of a closed crank case, a crank shaft and cam shaft mounted therein; gearing in said case between said shafts; a casting connected with said case having a cylinder opening at one end into said case, and provided with inlet and outlet ports at its outer end, and an air passage at one side of the cylinder communicating at one end with said crank case; a hollow cap covering the outer end of the casting, the interior of the cap communicating with the outer end of said passage; a piston in the cylinder, a piston rod connecting the piston with the crank-shaft; valves closing said ports, valve operating valves pivotally mounted in said cap, valve levers pivotally mounted in said cap, valve actuating rods engaging said levers and extending through said passage to the crank case, and cams on said cam shaft for operating said rods; with a carbureter exterior to the casting, means for conducting air from the interior of said cap to the carbureter, means for directing the mixture from said carbureter to the inlet port of the engine upon the intake stroke of the piston, and a perforated plug in the cap for permitting a small quantity of air to enter said air cap.

16. In an internal combustion engine having a substantially air tight crank case; a casting connected with said case having a cylinder opening at one end into said case, inlet and outlet ports in its other end and an air passage at one side of the cylinder communicating at one end with said crank case; a hollow cap covering the outer end of the casting, the interior of the cap communicating with the outer end of said passage; a valve for controlling the exhaust from said cylinder; a valve operating lever inside said cap; a rod adapted to engage said lever; a spring arranged to normally hold the rod out of engaging position; and a cam lever adapted to positively engage said rod and cause it to depress the lever and hold the valve open to prevent compression in the cylinder.

17. In an internal combustion engine having a substantially air tight crank case; a casting connected with said case having a cylinder opening at one end into said case, inlet and outlet ports in its other end and an air passage at one side of the cylinder communicating at one end with said crank case; a hollow cap covering the outer end of the casting, the interior of the cap communicating with the outer end of said passage; and a supporting base member for said casting having three bearing points upon the foundation upon which the base member is mounted, two bearing points being disposed at the opposite corners of one end of the base member, and the third being disposed at the center of the opposite end of the base member.

In testimony that I claim the foregoing as my own, I affix my signature.

ERNEST T. GILLIARD.